US008035053B2

(12) United States Patent
Skrdlant et al.

(10) Patent No.: US 8,035,053 B2
(45) Date of Patent: Oct. 11, 2011

(54) SORTING INSTALLATION AND SORTING METHOD FOR LETTERS AND LARGE LETTERS

(75) Inventors: Rolf-Peter Skrdlant, Constance (DE); Armin Zimmermann, Constance (DE)

(73) Assignee: Siemens AG, Munich (DE)

( * ) Notice: Subject to any disclaimer, the term of this patent is extended or adjusted under 35 U.S.C. 154(b) by 742 days.

(21) Appl. No.: 11/897,335

(22) Filed: Aug. 30, 2007

(65) Prior Publication Data

US 2008/0060981 A1 Mar. 13, 2008

(30) Foreign Application Priority Data

Sep. 2, 2006 (DE) ......................... 10 2006 041 253

(51) Int. Cl.
*G06K 9/00* (2006.01)

(52) U.S. Cl. ....................... 209/584; 209/900; 198/367.1

(58) Field of Classification Search .................. 209/584, 209/900; 198/367.1
See application file for complete search history.

(56) References Cited

U.S. PATENT DOCUMENTS

| | | | | |
|---|---|---|---|---|
| 3,573,748 A | 4/1971 | Holme | | |
| 4,310,276 A | 1/1982 | Castagnoli | | |
| 4,310,726 A | 1/1982 | Castagnoli | | |
| 5,994,657 A | 11/1999 | Maier et al. | | |
| 7,235,756 B2 * | 6/2007 | De Leo et al. | ................ | 209/584 |
| 2006/0102529 A1 * | 5/2006 | Wilke | ........................... | 209/584 |
| 2006/0124512 A1 * | 6/2006 | Quine et al. | .................. | 209/584 |
| 2006/0259185 A1 | 11/2006 | Berdelle-Hilge | | |
| 2007/0022719 A1 | 2/2007 | Berdelle-Hilge | | |
| 2007/0090027 A1 * | 4/2007 | Haselberger et al. | .......... | 209/584 |
| 2009/0050541 A1 * | 2/2009 | Berdelle-Hilge | ............. | 209/584 |
| 2009/0060698 A1 | 3/2009 | Enenkel | | |

FOREIGN PATENT DOCUMENTS

| | | |
|---|---|---|
| DE | 3010213 A1 | 10/1980 |
| DE | 103 42 804 B3 | 4/2005 |
| WO | 2005035146 A1 | 4/2005 |
| WO | 2006029212 A2 | 3/2006 |
| WO | 2006100592 A1 | 9/2006 |

OTHER PUBLICATIONS

Derwent Abstract—DE 103 42 804 B3; Apr. 14, 2005; Siemens AG, D-80333 Muenchen, Germany.

* cited by examiner

*Primary Examiner* — Terrell Matthews
(74) *Attorney, Agent, or Firm* — Laurence A. Greenberg; Werner H. Stemer; Ralph E. Locher

(57) ABSTRACT

A sorting installation for letters of a first kind and letters of a second kind includes circulating stacking locations for receiving the letters of the first kind delivered in any desired sequence, and circulating end locations ordered by destination addresses. A first controller is operable to transfer a letter of the first kind from a circulating stacking location to an end location assigned to a destination address of the letter of the first kind. The installation includes further letter-stacking locations for letters of the second kind. A second controller is operable to transfer a letter of the second kind from a letter-stacking location to an end location assigned to a destination address of the letter of the second kind.

14 Claims, 1 Drawing Sheet

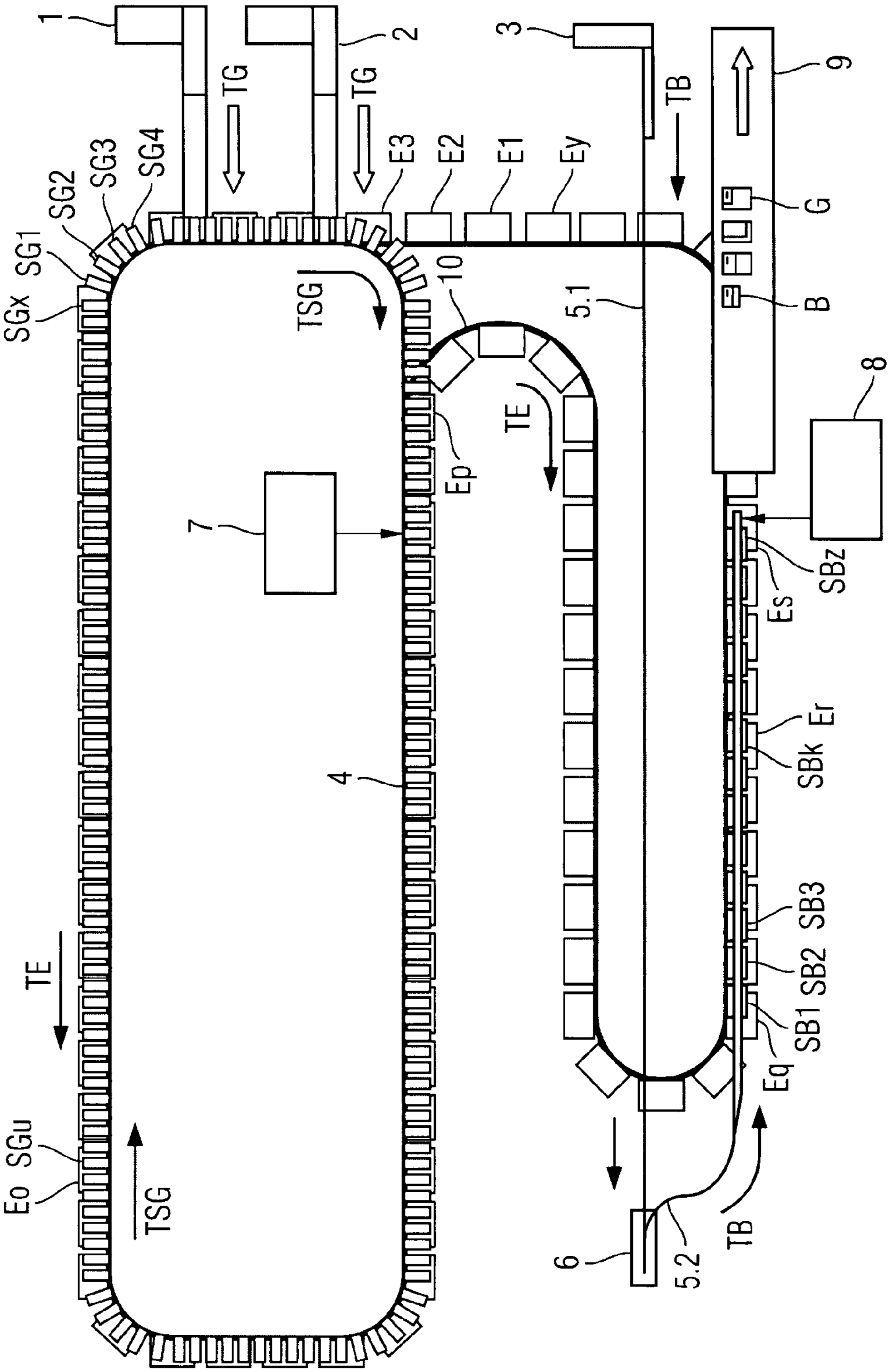
1
2
3
9
TG
TG
TB
E3
E2
E1
Ey
G
B
SG1
SG2
SG3
SG4
SGx
TSG
10
5.1
TE
Ep
8
7
SBz
Es
Er
SBk
4
SB3
SB2
SB1
Eq
TE
Eo
SGu
TSG
6
5.2
TB

SORTING INSTALLATION AND SORTING METHOD FOR LETTERS AND LARGE LETTERS

BACKGROUND OF THE INVENTION

The invention relates to a sorting installation for letters and large letters and to a method of sorting letters and large letters.

The present invention is suitable, in particular, for sorting large letters and letters into a common mail-delivery sequence. The term "mail-delivery sequence" is understood as meaning a sequence of letters and large letters which corresponds to the sequence in which the mail is delivered by the mailman during his delivery round. For this purpose, the letters and large letters, which are referred to jointly as items of mail hereinbelow, are sorted and arranged such that the first address stop is followed by the second address stop, which is followed by the third address stop, etc.

Up until now, the letters are arranged in the desired mail-delivery sequence in a number of sorting cycles in sorting installations for letters, for example a DBS installation (delivery barcode sorter), which is not suitable for sorting large letters. In addition, large letters are sorted on an interim basis in a sorting installation for large letters, for example an FSS installation (flat sorting system), and are then arranged manually in the desired mail-delivery sequence. It is obvious here that the operation of sorting large letters manually into the desired mail-delivery sequence is time-consuming and costly. The large letters are then added manually, by the mail man, to the letters which have already been arranged in the mail-delivery sequence, this operation also being referred to as collation or merging. This operation is also time-consuming and costly. Collation and sorting into a mail-delivery sequence take place over a number of successive time windows. A large amount of time is thus required overall. In addition it is not possible to use such an installation to sort letters and large letters jointly into a mail-delivery sequence.

As an alternative, it is possible, in a sorting installation, to provide an end location for each destination address, also referred to as delivery point or dispatch address. In a sorting cycle, over a large time window, all the large letters and letters with a certain destination address are sorted into that end location which has been assigned to this destination address. This operation is repeated for all the destination addresses until all the large letters and letters are assigned to the respective end locations. The end locations, finally, are emptied such that the destination addresses are in the order of the mail-delivery sequence. This solution, however, has the disadvantage that, for sorting the letters and large letters into a mail-delivery sequence, an end location is necessary for each destination address. This means that the number of end locations cannot be smaller than the number of destination addresses.

A further possibility is for separate streams of large letters and letters which have already been sorted into a mail-delivery sequence to be arranged in a joint mail-delivery sequence by means of a merger, that is to say an arrangement for bringing the letters and large letters together. An additional sorting cycle and/or an additional time window and, if appropriate, an additional sorting installation for implementing this sorting cycle are necessary here.

From the prior art, EP 0 820 818 A1 has disclosed an apparatus which is intended for sorting letters into a certain sequence and utilizes an interim store. The interim store comprises storage pockets which circulate in a conveying loop, with two semicircular conveying sections, on a conveying arrangement and can each receive an item of mail and discharge the same, on command, into the actual set-down containers. In the first instance here, all of the items of mail which are to be ordered are accommodated in any desired sequence in the storage pockets of the interim store. The items of mail are then removed from the storage pockets of the interim store, and transferred into the set-down containers, such that they are located in the latter in the order which is to be produced. The set-down containers, which are open at the top, are located along the rectilinear sections of the conveying arrangement, beneath the storage pockets.

SUMMARY OF THE INVENTION

It is an object of the invention to specify a sorting installation and a sorting method for large letters and letters in which two separate streams of large letters and letters can be sorted and collated into a mail-delivery sequence in a sorting installation in a joint processing cycle.

The solution according to the invention advantageously has a high throughput, in which case the large letters and letters can be automatically, that is to say mechanically, arranged in a joint mail-delivery sequence in a small time window.

Accordingly, one aspect involves a sorting installation for (large) letters of a first type and letters of a second type. The sorting installation has circulating stacking locations for receiving the large letters delivered in any desired sequence. Additionally provided are circulating end locations, which are arranged by destination addresses. Further provided is a controller which is constructed, and can be operated, such that a large letter is transferred from the stacking location to that end location which is assigned the destination address of the large letter. The sorting installation also has letter-stacking locations for letters, and a further controller which is constructed, and can be operated, such that the letter is transferred from the letter-stacking location to that end location which is assigned the destination address of the letter.

Another aspect involves a method of sorting (large) letters of a first type and letters of a second type. The large letters are transferred to circulating stacking locations in any desired sequence. In a further step, the large letters are transferred from the stacking locations to circulating end locations, which are ordered by destination addresses, such that the destination addresses of the large letters correspond to the destination addresses of the end locations. The letters are transferred to letter-stacking locations, and are transferred from the letter-stacking locations to the end locations with the corresponding destination addresses.

In one embodiment of the sorting installation, a first and a second loading station are provided for loading the stacking locations with large letters. The operation of loading the stacking locations with large letters can thus be accelerated, in which case the period of time required for sorting the large letters is reduced.

In addition, a first and a second letter-loading station may be provided for loading the letter-stacking locations with letters. The operation of loading the letter-stacking locations with letters can thus be accelerated.

In a further embodiment of the sorting installation, an arrangement is provided for emptying the end locations.

In another embodiment, an end location is assigned one destination address.

Furthermore, provision may be made for some of the end locations to be arranged beneath the stacking locations for large letters and for some of the end locations to be arranged beneath the letter-stacking locations.

In addition, provision is made for the stacking locations for large letters and the end locations to move in opposite directions. The period of time required for transferring the large letters from the stacking locations to the end locations can thus be reduced and, at the same time, the transporting speeds of the stacking locations and of the end locations can be kept sufficiently low.

Further, provision may be made for the letter-stacking locations to be arranged in a stationary manner.

Furthermore, provision may be made for the letter-stacking locations to be adapted to the format of the letters. It is thus possible for the installation space which is necessary for the letter-stacking locations to be reduced and for the stacking quality to be improved.

Finally, provision may be made for the letter-stacking locations to be divided up into groups. While the letter-stacking locations of one group are being filled with letters, it is possible for the letters from the letter-stacking locations of another group to be set down at the respectively associated circulating end locations. The throughput can be increased in this way.

In a development of the method of sorting large letters and letters according to the invention, provision is made for an end location to be assigned one destination address.

In a further embodiment of the sorting method, the destination addresses are assigned to the end locations such that the sequence of end locations corresponds to the mail-delivery sequence. When the stacking location which contains a large letter with a certain destination address is located above that end location which is assigned this destination address, the large letter is transferred from the stacking location to the end location.

Finally, when the end location which is assigned a certain destination address is located beneath that letter-stacking location which contains a letter with this destination address, the letter is transferred from the letter-stacking location to the end location.

BRIEF DESCRIPTION OF THE SEVERAL VIEWS OF THE DRAWINGS

A number of exemplary embodiments of the present invention are explained in more detail hereinbelow with reference to a single FIGURE. The single FIGURE shows:

A plan view of one embodiment of a sorting installation for sorting large letters and letters.

DETAILED DESCRIPTION OF THE INVENTION

The FIGURE shows a plan view of one embodiment of a sorting installation for sorting letters of a first type (hereinafter "large letters G") and letters of a second type (hereinafter "letters B"). The sorting installation comprises x stacking locations SG1, SG2, SG3 to SGx which, with the aid of a transporting belt 4, circulate in the manner of a carousel in a first direction, which is indicated by an arrow TSG. The sorting installation also comprises y end locations E1, E2, E3 to Ey, which likewise circulate in the manner of a carousel with the aid of a transporting belt 10. A series of end locations E3 to Ep is located beneath the stacking locations for the large letters SG1 to SGx and, in relation to the stacking locations SG1 to SGx, is moved in the opposite direction, which is indicated by the arrow TE. The sorting installation also comprises a series of stacking locations for letters SB1 to SBz, which are also referred to hereinbelow as letter-stacking locations. The letter-stacking locations SB1 to SBz are arranged in a stationary manner, that is to say they do not move. A further series of end locations Eq to Es is arranged beneath the letter-stacking locations SB1 to SBz. After one cycle, all the end locations E1 to Ey have moved past beneath the letter-stacking locations SB1 to SBz once. An arrangement 9 for emptying the end locations E1 to Ey is located at the end of the sorting installation. With the aid of a first loading station 1 for large letters and of a second loading station 2 for large letters, the large letters G are introduced individually, in order, as large-letter stream TG into one of the stacking locations SG1 to SGx in each case. The stacking locations SG1 to SGx are of pocket-like design and serve as interim stores for the large letters G.

In order to sort the large letters G into the desired mail-delivery sequence, each of the end locations E1 to Ey is assigned a respective destination address. It is thus possible, for example, for the end location E1 to be assigned the address "Tulpenstr. 1", for the end location E2 to be assigned the address "Tulpenstr. 1a", for the end location E3 to be assigned the address "Tulpenstr. 2", for the end location Eo to be assigned the address "Veilchenweg 17", for the end location Er to be assigned the address "Wendelsteinstr. 14", etc. If a large letter with the address "Veilchenweg 17" is located, for example, in the stacking location SGu, then a control means 7 causes the large letter to be transferred into the end location Eo when the stacking location SGu is located above the end location Eo. This operation is repeated for all the large letters located in the stacking locations SG1 to SGx until each large letter has been transferred into the corresponding end location E1 to Ey. In more general terms, this means that, when a stacking location which contains a large letter with a certain destination address is located above an end location which is assigned this destination address, this large letter is transferred from the stacking location to the end location.

In a sequence which has already been sorted into a mail-delivery sequence, the letters B are guided via a loading station 3 for letters, also referred to as a letter-loading station, in the direction of the arrow TB, as a letter stream, onto a first section 5.1 of a letter-transporting path and to a terminal station 6, and are then advanced, by a second section of the letter-transporting path 5.2, onto one of the letter-stacking locations SB1 to SBz. When an end location which is assigned a certain destination address is located beneath a letter-stacking location which contains a letter with this destination address, the letter is transferred from the letter-stacking location to the end location. If, for example, the end location Er, which is assigned the address "Wendelsteinstr. 14", is located beneath the letter-stacking location SBk, and if a letter with the destination address "Wendelsteinstr. 14" is located in the letter-stacking location SBk, this letter is transferred from the letter-stacking location SBk to the end location Er. The transfer of the letters from the letter-stacking locations SB1 to SBz to the corresponding end locations E1 to Ey is controlled by a control means 8.

As soon as the end location Er has reached the arrangement 9 for emptying the end locations, this arrangement being provided at the end of the sorting installation, the letters and large letters which are located in the end location Er are removed there by the arrangement 9. All the end locations E1 to Ey are emptied one after the other with the aid of the arrangement 9, in which case the sorting of the letters B and large letters G which is predetermined by the sequence of the end locations E1 to Ey is maintained.

The letter stream TB transported by the letter-transporting path 5.1, 5.2 has already been sorted on a preliminary basis, that is to say it has already undergone the first sorting cycle for mail-delivery-sequence sorting in a letter-sorting installation. As the large letters G are set down at the circulating end locations E1 to Ey, the letter-stacking locations SB1 to SBz are filled with one or more letters for a respective destination address via conventional mail technology, for example with similarities to a final distributing machine FVM (also referred to as an FSM (same machine), which stands for Final Sorting Machine). In this final sorting cycle, the letter-stacking locations SB1 to SBz have a sorting function.

It is advantageous if, during preliminary sorting of the letters in a letter-sorting installation (not shown in the FIGURE) (first sorting cycle for a mail-delivery sequence sorting), as far as possible all the compartments of the letter-sorting installation are utilized, in order for the number of letter-stacking locations SB1 to SBz which are necessary in the sorting installation according to the invention to be kept as small as possible.

It is also advantageous for use to be made of letter-stacking locations SB1 to SBz which, rather than being configured both for large letters and letters, are optimized for the smaller letter format. This relates, in particular, to stacking quality, installation space, production costs and discharge behavior at the end locations E1 to Ey. If the items of mail are fed into the storing installation, as is shown in the FIGURE, from the right, it is advantageous to provide a terminal station 6 along the transporting path of the letters, in order to ensure that the letters are aligned along the reference edge in the end locations E1 to Ey with the destination address at the top. Moreover, it is advantageous here to use a letter-transporting path in order to be able to transfer from vertical to horizontal letter-transporting technology.

It is additionally possible to provide a second loading station for letters, which has not been shown in the FIGURE, in order thus to be able to increase the average number of letters at each end location.

The letter-stacking locations SB1 to SBz can be divided up into a number of regions or groups during the sorting process. While the letter-stacking locations of one region are being filled with letters, the letters from the letter-stacking locations of another region can be deposited at the respectively associated circulating end locations. It is thus possible to increase the throughput and to reduce the stoppage periods required for letter introductions and for the circulating end locations and/or for large-letter introductions. It should be the case here that the letters for a destination address are already in the letter-stacking location/s when the associated circulating end location reaches this/these letter-stacking location/s.

The above description of the exemplary embodiments according to the present invention serves merely for illustrative purposes, and does not serve to limit the invention in any way. Within the framework of the invention, various changes and modifications are possible without departing from the scope of the invention or the equivalents thereof.

LIST OF REFERENCE NUMERALS

1 First loading station for large letters
2 Second loading station for large letters
3 Loading station for letters
4 Transporting belt for the stacking locations
5.1 First section of a letter-transporting path
5.2 Second section of a letter-transporting path
6 Terminal station
7 Control means for the stacking locations for large letters
8 Control means for the letter-stacking locations
9 Arrangement for emptying the end locations
10 Transporting belt for the end locations
B Letter
G Large letter
SG1 First stacking location for large letters
SG2 Second stacking location for large letters
SGn u-th stacking location for large letters
SGx-th stacking location for large letters
E1 First end location
E2 Second end location
Eo o-th end location
Ep, Eq, Es Further end locations
Ey y-th end location
SB1 First stacking location for letters
SB2 Second stacking location for letters
SBk k-th stacking location for letters
SBz z-th stacking location for letters
TB Transporting direction of letters
TG Transporting direction of large letters
TSG Transporting direction of stacking locations for large letters
TE Transporting direction of end locations

What is claimed is:

1. A sorting installation for letters of a first kind and letters of a second kind, comprising:
- circulating stacking locations for receiving the letters of the first kind delivered in any desired sequence;
- circulating end locations ordered by destination addresses;
- a first controller configured for operating to transfer a letter of the first kind from a circulating stacking location to one of said circulating end locations assigned to a destination address of the letter of the first kind;
- letter-stacking locations for letters of the second kind;
- a second controller configured for operating to transfer a letter of the second kind from a letter-stacking location to one of said circulating end locations assigned to a destination address of the letter of the second kind.

2. The sorting installation of claim 1, further comprising a first and a second loading station for loading the circulating stacking locations with letters of the first kind.

3. The sorting installation of claim 1, further comprising a first and a second letter-loading station for loading the letter-stacking locations with letters of the second kind.

4. The sorting installation of claim 1, further comprising an arrangement for emptying the end locations.

5. The sorting installation of claim 1, wherein an end location is assigned one destination address.

6. The sorting installation of claim 1, wherein some of the end locations are arranged beneath the stacking locations for letters of the first type, and wherein some of the end locations are arranged beneath the letter-stacking locations for letters of the second type.

7. The sorting installation of claim 1, wherein provision is made for the stacking locations for the letters of the first type and the end locations to move relative to one another in opposite directions.

8. The sorting installation of claim 1, wherein the letter-stacking locations are arranged in a stationary manner.

9. The sorting installation of claim 1, wherein the letter-stacking locations are adapted to a format of the letter of the second type.

10. The sorting installation of claim 1, wherein the letter-stacking locations are divided up into groups.

11. A method of sorting letters of a first type and letters of a second type, comprising:
- transferring letters of the first type to circulating stacking locations in any desired sequence;
- transferring the letters of the first type from the circulating stacking locations to circulating end locations, which are ordered by destination addresses, such that destination addresses of the letters of the first type correspond to a destination addresses of the end locations;

transferring letters of the second type to letter-stacking locations; and transferring the letters of the second type from the letter-stacking locations to the end locations.

12. The method of claim 11, further comprising assigning an end location to one destination address.

13. The method of claim 11, further comprising:

assigning the destination addresses to the end locations such that a sequence of end locations corresponds to a mail delivery sequence; and when the stacking location, which contains a letter of the first type with a certain destination address, is located above that end location, which is assigned to this destination address, transferring the letter of the first type from the stacking location to the end location.

14. The method of claim 11, further comprising, when the end location assigned to a certain destination address is located beneath a letter-stacking location which contains a letter of the second type with this destination address, transferring the letter of the second type from the letter-stacking location to the end location.

* * * * *